United States Patent
Verghese et al.

(10) Patent No.: US 9,388,311 B2
(45) Date of Patent: Jul. 12, 2016

(54) AMPHIPHILIC BLOCK COPOLYMERS AND INORGANIC NANOFILLERS TO ENHANCE PERFORMANCE OF THERMOSETTING POLYMERS

(75) Inventors: Kandathil Eapen Verghese, Lake Orion, MI (US); Ha Q. Pham, Lake Jackson, TX (US); George Jacob, Lake Jackson, TX (US); Marvin L. Dettloff, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 870 days.

(21) Appl. No.: 12/668,777

(22) PCT Filed: Jul. 28, 2008

(86) PCT No.: PCT/US2008/071301
§ 371 (c)(1),
(2), (4) Date: Jan. 12, 2010

(87) PCT Pub. No.: WO2009/018193
PCT Pub. Date: Feb. 5, 2009

(65) Prior Publication Data
US 2010/0197848 A1    Aug. 5, 2010

Related U.S. Application Data

(60) Provisional application No. 60/962,994, filed on Aug. 2, 2007.

(51) Int. Cl.
*C08L 21/00* (2006.01)
*C08L 71/02* (2006.01)
*C08L 63/00* (2006.01)
*C08K 3/36* (2006.01)

(52) U.S. Cl.
CPC ............... *C08L 71/02* (2013.01); *C08L 63/00* (2013.01); *C08K 3/36* (2013.01); *C08L 2205/05* (2013.01)

(58) Field of Classification Search
CPC ..................................................... C08L 63/00
USPC ................................................... 524/492
See application file for complete search history.

(56) References Cited

U.S. PATENT DOCUMENTS

| | | | |
|---|---|---|---|
| 2,750,395 A | 12/1956 | Phillips et al. | |
| 2,890,194 A | 6/1959 | Phillips et al. | |
| 3,018,262 A | 1/1962 | Schroeder et al. | |
| 4,889,885 A | 12/1989 | Usuki et al. | |
| 5,064,464 A | 11/1991 | Sawada et al. | |
| 5,194,128 A | 3/1993 | Beaty et al. | |
| 5,262,507 A | 11/1993 | Decker et al. | |
| 5,385,990 A | 1/1995 | Abbey et al. | |
| 5,405,688 A | 4/1995 | Decker et al. | |
| 5,407,458 A | 4/1995 | Konig et al. | |
| 5,447,708 A | 9/1995 | Helble et al. | |
| 5,486,675 A | 1/1996 | Taylor et al. | |
| 5,578,672 A | 11/1996 | Beall et al. | |
| 5,851,501 A | 12/1998 | Krutzsch et al. | |
| 5,984,997 A | 11/1999 | Bickmore et al. | |
| 6,117,932 A | 9/2000 | Hasegawa et al. | |
| 6,153,719 A | 11/2000 | Abbey et al. | |
| 6,242,083 B1 | 6/2001 | McGrail et al. | |
| 6,287,992 B1 | 9/2001 | Polansky et al. | |
| 6,572,971 B2 | 6/2003 | Martin et al. | |
| 6,613,839 B1 | 9/2003 | Gan et al. | |
| 6,887,574 B2 | 5/2005 | Dean et al. | |
| 7,037,958 B1 | 5/2006 | Hansen et al. | |
| 7,087,304 B1 | 8/2006 | Woods et al. | |
| 7,163,973 B2 | 1/2007 | Ahsan | |
| 2004/0247881 A1 | 12/2004 | Dean et al. | |
| 2005/0031870 A1 | 2/2005 | Liu et al. | |
| 2005/0136259 A1 | 6/2005 | Mohanty et al. | |
| 2005/0171237 A1 | 8/2005 | Patel et al. | |
| 2006/0154078 A1* | 7/2006 | Watanabe et al. | 428/413 |
| 2006/0194038 A1* | 8/2006 | You et al. | 428/323 |
| 2006/0205856 A1 | 9/2006 | Williamson et al. | |
| 2006/0228261 A1 | 10/2006 | Iwamoto et al. | |
| 2006/0293172 A1 | 12/2006 | Rubinsztajn et al. | |
| 2007/0142548 A1 | 6/2007 | Nejhad et al. | |

FOREIGN PATENT DOCUMENTS

| | | | | |
|---|---|---|---|---|
| EP | 0906927 | | 7/1999 | |
| EP | 0915118 | | 12/1999 | |
| WO | 2005097893 | | 10/2005 | |
| WO | 2006052726 | | 5/2006 | |
| WO | 2006052727 | | 5/2006 | |
| WO | 2006052729 | | 5/2006 | |
| WO | 2006052730 | | 5/2006 | |
| WO | WO2006052726 | * | 5/2006 | ............. C08L 63/00 |
| WO | 2007124894 | | 8/2007 | |

OTHER PUBLICATIONS

Ratna, D., Bathia, A.K., "Rubber Toughened Epoxy," Macromolecular Research, 2004, 12(1) pp. 11-21.

"Toughening Structural adhesives via nano- and micro-phase inclusions," Kinloch, A. J.; Lee, J.H.; Taylor, A. C.; Sprenger, S.; Eger, C.; Egan, D.; Journal of Adhesion (2003), 79(8-9), pp. 867-873.

"Toughening Structural adhesives via nano- and micro-phase inclusions," Kinloch, A. J.; Lee, J.H.; Taylor, A. C.; Sprenger, S.; Eger, C.; Egan, D.; Proceedings of the Annual Meeting of the Adhesion Society (2004), 27th, pp. 96-98.

(Continued)

*Primary Examiner* — Ling Choi
*Assistant Examiner* — Lanee Reuther

(57) ABSTRACT

Curable compositions, cured compositions, and methods of forming the same, including an epoxy resin, a curing agent, an amphiphilic toughening agent, and an inorganic nanofiller, wherein the toughening agent forms a second phase having at least one dimension being on the nanometer scale.

10 Claims, No Drawings

(56) References Cited

OTHER PUBLICATIONS

"The effect of silica nano particles and rubber particles on the toughness of multiphase thermosetting epoxy polymers," Kinloch, A.J.; Mohammed, R.D.; Taylor, A.C.; Eger, C.; Sprenger, S.; Egan, D.; Journal of Materials Science (2005), 40(18), pp. 5083-5086.

"Epoxy FRCS Toughened with rubber particles and nanoparticles." Kinloch, Anthony J.; Mohammed, Reza C.; Taylor Ambrose D.; Sprenger, Stephans; Eger, Christian; International SAMPE Symposium and Exhibition (2005), 50 (New Horizon for Materials and Processing Technologies), pp. 792-799.

"The interlaminar toughness of carbon-fibre reinforced plastic compsites using 'hybridtoughened' matches," Kinloch, A. J.; Mohammed, R.D.; Taylor, A.C.; Sprenger, S.; Egan, D., Journal of Materials Science (2006), 41(15), pp. 5043-5046.

"Improving structural epoxy adhesives with SiO2 nanoparticles," Sprenger, S.; Kinloch, A.J. Taylor, A.C.; Lee, J.H.; Mohammed, R.D.; Egan, D., Proceeding of the Annual Meeting of the Adhesion Society (2006), 29th, pp. 232-234.

"Micellar Structure and Mechanical properties of Block Copolymer-Modified Epoxies", Journal of Polymer Science, Part B: Polymer Physics, 2001, vol. 39 (23), pp. 2996-3010.

"Self-Assembly and Polymerization of Epoxy Resin-Amphiphilic Block Copolymer-Modified Epoxies", Journal of the American Chemical Society, 1997, vol. 119 (11), pp. 2749-2750.

"Reactive Block Copolymers for Modification of Thermosetting Epoxy", Macromolecules, 2000, vol. 33(26), pp. 9522-9534.

"Ultimate Properties of Epoxy Resins Modified with a Polysiloxane-Polycaprolactone Block Copolymer", Journal of Applied Polymer Science, 1994, vol. 54, pp. 815-826.

"Dynamics and Morphology in Nanostructured Thermoset Network/Block Copolymer Blends During Network Formation", Macromolecules, 2000, vol. 33, pp. 5235-5244.

"Phase Behavior, Crystallization, and Hierarchical Nanostructures in Self-Organized Thermoset Blends of Epoxy Resin and Amphiphilic Poly (ethylene oxide)-block-poly(propylene oxide)-block-poly(ethylene oxide) Triblock Copolymers", Macromolecules, 2002, vol. 35, pp. 3133-3144.

\* cited by examiner

AMPHIPHILIC BLOCK COPOLYMERS AND INORGANIC NANOFILLERS TO ENHANCE PERFORMANCE OF THERMOSETTING POLYMERS

CROSS REFERENCE TO RELATED APPLICATIONS

This is a §371 application of PCT International Patent Application Number PCT/US2008/071301 filed Jul. 28, 2008, and claims priority from provisional application Ser. No. 60/962,994 filed Aug. 2, 2007, each of which is incorporated herein by reference in its entirety.

BACKGROUND OF DISCLOSURE

1. Field of the Disclosure

Embodiments disclosed herein relate generally to epoxy resins and epoxy resin compositions. More specifically, embodiments disclosed herein relate to curable compositions and cured compositions including an epoxy resin, an amphiphilic block copolymer toughening agent, and an inorganic nanofiller.

2. Background

Epoxies resins are one of the most widely used engineering resins, and are well-known for their use in composites with high strength fibers. Epoxy resins form a glassy network, exhibit excellent resistance to corrosion and solvents, good adhesion, reasonably high glass transition temperatures, and adequate electrical properties. Unfortunately, crosslinked, glassy epoxy resins with relatively high glass transition temperatures (>100° C.) are brittle. The poor impact strength of high glass transition temperature epoxy resins limits the usage of epoxies as structural materials and in composites.

The impact strength, fracture toughness, ductility, as well as most other physical properties of crosslinked epoxy resins is controlled by the chemical structure and ratio of the epoxy resin and hardener, by any added macroscopic fillers, toughening agents, and other additives, and by the curing conditions used. For example, rubber toughening agents have been added to epoxies to improve ductility, with a corresponding decrease in stiffness. See, for example, Ratna, D., Banthia, A. K., "Rubber Toughened Epoxy," Macromolecular Research, 2004, 12(1), pages 11-21. Macroscopic inorganic fillers may be used to compensate for the decrease in stiffness, with a corresponding decrease in ductility. The use of both macroscopic inorganic fillers and toughening agents in an epoxy resin composition, in general, results in less than optimal improvements in stiffness and ductility due to the offsetting effects on properties. Use of various toughening agents may also result in a decrease in flow and hot wet properties, the former being due to changes in rheology of the modified system.

Toughening agents used to improve fracture toughness of epoxies include linear polybutadiene-polyacrylonitrile copolymers, oligomeric polysiloxanes, and organopolysiloxane resins. See, for example, U.S. Pat. No. 5,262,507. Other toughening agents may include carboxyl terminated butadiene, polysulfide-based toughening agents, amine-terminated butadiene nitrile, and polythioethers. See, for example, U.S. Pat. Nos. 7,087,304 and 7,037,958.

Nanoparticles may be used, for example, to improve the stiffness and dimensional stability of resulting structural composites. See, for example, U.S. Patent Application Publication Nos. 20040188883, 20060293172, 20060228261, and 20050136259.

Kinloch et al. describe the use of nanosilica and ATBN or CTBN toughening agents in epoxy thermoset compositions, and the resulting impact on glass transition temperature, toughness and other properties. See, for example, "Toughening structural adhesives via nano- and micro-phase inclusions," Kinloch, A. J.; Lee, J. H.; Taylor, A. C.; Sprenger, S.; Eger, C.; Egan, D., Journal of Adhesion (2003), 79(8-9), 867-873; "Toughening structural adhesives using nano- and micro-phase inclusions," Kinloch, A. A.; Lee, J. H.; Taylor, A. C.; Sprenger, S.; Eger, C.; Egan, D., Proceedings of the Annual Meeting of the Adhesion Society (2004), 27$^{th}$, 96-98; "The effect of silica nano particles and rubber particles on the toughness of multiphase thermosetting epoxy polymers," Kinloch, A. J.; Mohammed, R. D.; Taylor, A. C.; Eger, C.; Sprenger, S.; Egan, D., Journal of Materials Science (2005), 40(18), 5083-5086; "Epoxy FRCS toughened with rubber and nanoparticles." Kinloch, Anthony J.; Mohammed, Reza C.; Taylor, Ambrose D.; Sprenger, Stephan; Eger, Christian; International SAMPE Symposium and Exhibition (2005), 50 (New Horizons for Materials and Processing Technologies), 792-799; "The interlaminar toughness of carbon-fibre reinforced plastic composites using 'hybrid-toughened' matrices," Kinloch, A. J.; Mohammed, R. D.; Taylor, A. C.; Sprenger, S.; Egan, D., Journal of Materials Science (2006), 41(15), 5043-5046' and "Improving structural epoxy adhesives with SiO2 nanoparticles," Sprenger, S.; Kinloch, A. J.; Taylor, A. C.; Lee, J. H.; Mohammed, R. D.; Egan, D., Proceedings of the Annual Meeting of the Adhesion Society (2006), 29th 232-234.

U.S. Patent Application Publication No. 20050031870 discloses a composite powder which can be used to toughen plastics. The composite powder is formed by compounding powdery rubbers with inorganic particles. The composite powder may then be blended with plastic matrices, including epoxy resins, to result in a toughened plastic.

U.S. Patent Application Publication No. 20060205856 discloses a composition comprising a thermoplastic polyester compound and sepiolite-type clay. The composition may also include 0.5 to 20 weight percent of a toughening agent and up to 1 weight percent of an epoxy.

Accordingly, there exists a need for epoxies having good ductility and good stiffness properties.

SUMMARY OF THE DISCLOSURE

In one aspect, embodiments disclosed herein relate to a curable composition, including: an epoxy resin; a curing agent; an amphiphilic toughening agent that creates a second phase with at least one dimension being on the nanometer scale; and an inorganic nanofiller.

In another aspect, embodiments disclosed herein relate to a composite, including: 30 to 98 percent by volume of an epoxy resin; an amphiphilic toughening agent forming a second phase and having at least one dimension being on the nanometer scale; and an inorganic nanofiller.

In another aspect, embodiments disclosed herein relate to a method of forming a composite, the method including: admixing an epoxy resin, a curing agent, an amphiphilic toughening agent, and an inorganic nanofiller to form a curable composition; curing the curable composition to form a composite; wherein the toughening agent forms a second phase having at least one dimension being on the nanometer scale.

Other aspects and advantages will be apparent from the following description and the appended claims.

DETAILED DESCRIPTION

In one aspect, embodiments disclosed herein relate to curable compositions including an epoxy resin, an amphiphilic block copolymer toughening agent, and an inorganic nanofiller. In another aspect, embodiments disclosed herein relate to composites formed by curing a composition including an epoxy resin, an amphiphilic block copolymer toughening agent, and an inorganic nanofiller. In other aspects, embodiments disclosed herein relate to epoxy-based composites having improved fracture toughness and methods to produce the same.

It has been unexpectedly discovered that there is a synergistic effect when some combinations of inorganic nanofillers and amphiphilic block copolymer toughening agents are used in an epoxy-based composition. Whereas use of nanofillers or toughening agents alone may provide some improvement in fracture toughness, use of a combination of inorganic nanofillers and amphiphilic block copolymer toughening agents, even at lower loading levels than when used alone, may improve fracture toughness to a greater extent than the sum of what would be expected when the two are added together. Improvements in fracture toughness, in some embodiments, may be realized while maintaining or enhancing the hardness of the cured material. Improvements in fracture toughness, in some embodiments, may be realized without a significant decrease in other properties, such as glass transition temperature or heat deflection temperature.

Composites and curable compositions disclosed herein having improved fracture toughness may include an epoxy resin, an amphiphilic block copolymer toughening agent, an inorganic nanofiller, and a hardener or a curing agent. The curable compositions may also include catalysts and other additives. Each of these is described in detail below.

Epoxy Resins

The epoxy resins used in embodiments disclosed herein may vary and includes conventional and commercially available epoxy resins, which may be used alone or in combinations of two or more. In choosing epoxy resins for compositions disclosed herein, consideration should not only be given to properties of the final product, but also to viscosity and other properties that may influence the processing of the resin composition.

The epoxy resin component may be any type of epoxy resin, including any material containing one or more reactive oxirane groups, referred to herein as "epoxy groups" or "epoxy functionality." Epoxy resins useful in embodiments disclosed herein may include mono-functional epoxy resins, multi- or poly-functional epoxy resins, and combinations thereof. Monomeric and polymeric epoxy resins may be aliphatic, cycloaliphatic, aromatic, or heterocyclic epoxy resins. The polymeric epoxies include linear polymers having terminal epoxy groups (a diglycidyl ether of a polyoxyalkylene glycol, for example), polymer skeletal oxirane units (polybutadiene polyepoxide, for example) and polymers having pendant epoxy groups (such as a glycidyl methacrylate polymer or copolymer, for example). The epoxies may be pure compounds, but are generally mixtures or compounds containing one, two or more epoxy groups per molecule. In some embodiments, epoxy resins may also include reactive —OH groups, which may react at higher temperatures with anhydrides, organic acids, amino resins, phenolic resins, or with epoxy groups (when catalyzed) to result in additional crosslinking.

In general, the epoxy resins may be glycidated resins, cycloaliphatic resins, epoxidized oils, and so forth. The glycidated resins are frequently the reaction product of epichlorohydrin and a bisphenol compound, such as bisphenol A; $C_4$ to $C_{28}$ alkyl glycidyl ethers; $C_2$ to $C_{28}$ alkyl- and alkenyl-glycidyl esters; $C_1$ to $C_{28}$ alkyl-, mono- and poly-phenol glycidyl ethers; polyglycidyl ethers of polyvalent phenols, such as pyrocatechol, resorcinol, hydroquinone, 4,4'-dihydroxy-diphenyl methane (or bisphenol F), 4,4'-dihydroxy-3,3'-dimethyldiphenyl methane, 4,4'-dihydroxydiphenyl dimethyl methane (or bisphenol A), 4,4'-dihydroxydiphenyl methyl methane, 4,4'-dihydroxydiphenyl cyclohexane, 4,4'-dihydroxy-3,3'-dimethyldiphenyl propane, 4,4'-dihydroxydiphenyl sulfone, and tris(4-hydroxyphynyl)methane; polyglycidyl ethers of the chlorination and bromination products of the above-mentioned diphenols; polyglycidyl ethers of novolacs; polyglycidyl ethers of diphenols obtained by esterifying ethers of diphenols obtained by esterifying salts of an aromatic hydrocarboxylic acid with a dihaloalkane or dihalogen dialkyl ether; polyglycidyl ethers of polyphenols obtained by condensing phenols and long-chain halogen paraffins containing at least two halogen atoms. Other examples of epoxy resins useful in embodiments disclosed herein include bis-4,4'-(1-methylethylidene)phenol diglycidyl ether and (chloromethyl) oxirane Bisphenol A diglycidyl ether.

In some embodiments, the epoxy resin may include glycidyl ether type; glycidyl-ester type; alicyclic type; heterocyclic type, and halogenated epoxy resins, etc. Non-limiting examples of suitable epoxy resins may include cresol novolac epoxy resin, phenolic novolac epoxy resin, biphenyl epoxy resin, hydroquinone epoxy resin, stilbene epoxy resin, and mixtures and combinations thereof.

Suitable polyepoxy compounds may include resorcinol diglycidyl ether (1,3-bis-(2,3-epoxypropoxy)benzene), diglycidyl ether of bisphenol A (2,2-bis(p-(2,3-epoxypropoxy)phenyl)propane), triglycidyl p-aminophenol (4-(2,3-epoxypropoxy)-N,N-bis(2,3-epoxypropyl)aniline), diglycidyl ether of bromobisphenol A (2,2-bis(4-(2,3-epoxypropoxy)-3-bromo-phenyl)propane), diglycidylether of Bisphenol F (2,2-bis(p-(2,3-epoxypropoxy)phenyl)methane), triglycidyl ether of meta- and/or para-aminophenol (3-(2,3-epoxypropoxy)N,N-bis(2,3-epoxypropyl)aniline), and tetraglycidyl methylene dianiline (N,N,N',N'-tetra(2,3-epoxypropyl) 4,4'-diaminodiphenyl methane), and mixtures of two or more polyepoxy compounds. A more exhaustive list of useful epoxy resins found may be found in Lee, H. and Neville, K., Handbook of Epoxy Resins, McGraw-Hill Book Company, 1982 reissue.

Other suitable epoxy resins include polyepoxy compounds based on aromatic amines and epichlorohydrin, such as N,N'-diglycidyl-aniline; N,N'-dimethyl-N,N'-diglycidyl-4,4'-diaminodiphenyl methane; N,N,N',N'-tetraglycidyl-4,4'-diaminodiphenyl methane; N-diglycidyl-4-aminophenyl glycidyl ether; and N,N,N',N'-tetraglycidyl-1,3-propylene bis-4-aminobenzoate. Epoxy resins may also include glycidyl derivatives of one or more of: aromatic diamines, aromatic monoprimary amines, aminophenols, polyhydric phenols, polyhydric alcohols, polycarboxylic acids.

Useful epoxy resins include, for example, polyglycidyl ethers of polyhydric polyols, such as ethylene glycol, triethylene glycol, 1,2-propylene glycol, 1,5-pentanediol, 1,2,6-hexanetriol, glycerol, and 2,2-bis(4-hydroxy cyclohexyl)propane; polyglycidyl ethers of aliphatic and aromatic polycarboxylic acids, such as, for example, oxalic acid, succinic acid, glutaric acid, terephthalic acid, 2,6-naphthalene dicarboxylic acid, and dimerized linoleic acid; polyglycidyl ethers of polyphenols, such as, for example, bis-phenol A, bis-phenol F, 1,1-bis(4-hydroxyphenyl)ethane, 1,1-bis(4-hydroxyphenyl)isobutane, and 1,5-dihydroxy naphthalene; modified epoxy resins with acrylate or urethane moieties; glycidylamine epoxy resins; and novolac resins.

The epoxy compounds may be cycloaliphatic or alicyclic epoxides. Examples of cycloaliphatic epoxides include diepoxides of cycloaliphatic esters of dicarboxylic acids such as bis(3,4-epoxycyclohexylmethyl)oxalate, bis(3,4-epoxycyclohexylmethyl)adipate, bis(3,4-epoxy-6-methylcyclohexylmethyl)adipate, bis(3,4-epoxycyclohexylmethyl)pimelate; vinylcyclohexene diepoxide; limonene diepoxide; dicyclopentadiene diepoxide; and the like. Other suitable diepoxides of cycloaliphatic esters of dicarboxylic acids are described, for example, in U.S. Pat. No. 2,750,395.

Other cycloaliphatic epoxides include 3,4-epoxycyclohexylmethyl-3,4-epoxycyclohexane carboxylates such as 3,4-epoxycyclohexylmethyl-3,4-epoxycyclohexane carboxylate; 3,4-epoxy-1-methylcyclohexyl-methyl-3,4-epoxy-1-methylcyclohexane carboxylate; 6-methyl-3,4-epoxycyclohexylmethylmethyl-6-methyl-3,4-epoxycyclohexane carboxylate; 3,4-epoxy-2-methylcyclohexylmethyl-3,4-epoxy-2-methylcyclohexane carboxylate; 3,4-epoxy-3-methylcyclohexyl-methyl-3,4-epoxy-3-methylcyclohexane carboxylate; 3,4-epoxy-5-methylcyclohexyl-methyl-3,4-epoxy-5-methylcyclohexane carboxylate and the like. Other suitable 3,4-epoxycyclohexylmethyl-3,4-epoxycyclohexane carboxylates are described, for example, in U.S. Pat. No. 2,890,194.

Further epoxy-containing materials which are particularly useful include those based on glycidyl ether monomers. Examples are di- or polyglycidyl ethers of polyhydric phenols obtained by reacting polyhydric phenol with an excess of chlorohydrin such as epichlorohydrin. Such polyhydric phenols include resorcinol, bis(4-hydroxyphenyl)methane (known as bisphenol F), 2,2-bis(4-hydroxyphenyl)propane (known as bisphenol A), 2,2-bis(4'-hydroxy-3',5'-dibromophenyl)propane, 1,1,2,2-tetrakis(4'-hydroxy-phenyl) ethane or condensates of phenols with formaldehyde that are obtained under acid conditions such as phenol novolacs and cresol novolacs. Examples of this type of epoxy resin are described in U.S. Pat. No. 3,018,262. Other examples include di- or polyglycidyl ethers of polyhydric alcohols such as 1,4-butanediol, or polyalkylene glycols such as polypropylene glycol and di- or polyglycidyl ethers of cycloaliphatic polyols such as 2,2-bis(4-hydroxycyclohexyl)propane. Other examples are monofunctional resins such as cresyl glycidyl ether or butyl glycidyl ether.

Another class of epoxy compounds are polyglycidyl esters and poly(beta-methylglycidyl) esters of polyvalent carboxylic acids such as phthalic acid, terephthalic acid, tetrahydrophthalic acid or hexahydrophthalic acid. A further class of epoxy compounds are N-glycidyl derivatives of amines, amides and heterocyclic nitrogen bases such as N,N-diglycidyl aniline, N,N-diglycidyl toluidine, N,N,N',N'-tetraglycidyl bis(4-aminophenyl)methane, triglycidyl isocyanurate, N,N'-diglycidyl ethyl urea, N,N'-diglycidyl-5,5-dimethylhydantoin, and N,N'-diglycidyl-5-isopropylhydantoin.

Still other epoxy-containing materials are copolymers of acrylic acid esters of glycidol such as glycidylacrylate and glycidylmethacrylate with one or more copolymerizable vinyl compounds. Examples of such copolymers are 1:1 styrene-glycidylmethacrylate, 1:1 methylmethacrylate-glycidylacrylate and a 62.5:24:13.5 methylmethacrylate-ethyl acrylate-glycidylmethacrylate.

Epoxy compounds that are readily available include octadecylene oxide; glycidylmethacrylate; diglycidyl ether of bisphenol A; D.E.R. 331, D.E.R. 332 and D.E.R. 334 from The Dow Chemical Company, Midland, Mich.; vinylcyclohexene dioxide; 3,4-epoxycyclohexylmethyl-3,4-epoxycyclohexane carboxylate; 3,4-epoxy-6-methylcyclohexyl-methyl-3,4-epoxy-6-methylcyclohexane carboxylate; bis(3,4-epoxy-6-methylcyclohexylmethyl)adipate; bis(2,3-epoxycyclopentyl)ether; aliphatic epoxy modified with polypropylene glycol; dipentene dioxide; epoxidized polybutadiene; silicone resin containing epoxy functionality; flame retardant epoxy resins (such as a brominated bisphenol type epoxy resin available under the tradename D.E.R. 580, available from The Dow Chemical Company, Midland, Mich.); 1,4-butanediol diglycidyl ether of phenol-formaldehyde novolac (such as those available under the tradenames D.E.N. 431 and D.E.N. 438 available from The Dow Chemical Company, Midland, Mich.); and resorcinol diglycidyl ether Although not specifically mentioned, other epoxy resins under the tradename designations D.E.R. and D.E.N. available from the Dow Chemical Company may also be used. In some embodiments, epoxy resin compositions may include epoxy resins formed by reacting a diglycidyl ether of bisphenol A with bisphenol A.

Other suitable epoxy resins are disclosed in, for example, U.S. Pat. Nos. 7,163,973, 6,887,574, 6,632,893, 6,242,083, 7,037,958, 6,572,971, 6,153,719, and 5,405,688, PCT Publication WO 2006/052727, and U.S. Patent Application Publication Nos. 20060293172 and 20050171237, each of which is hereby incorporated herein by reference.

Hardeners/Curing Agents

A hardener or curing agent may be provided for promoting crosslinking of the epoxy resin composition to form a polymer composition. As with the epoxy resins, the hardeners and curing agents may be used individually or as a mixture of two or more. The curing agent component (also referred to as a hardener or cross-linking agent) may include any compound having an active group being reactive with the epoxy group of the epoxy resin. The curing agents may include nitrogen-containing compounds such as amines and their derivatives; oxygen-containing compounds such as carboxylic acid terminated polyesters, anhydrides, phenol-formaldehyde resins, brominated phenolic resins, amino-formaldehyde resins, phenol, bisphenol A and cresol novolacs, phenolic-terminated epoxy resins; sulfur-containing compounds such as polysulfides, polymercaptans; and catalytic curing agents such tertiary amines, Lewis acids, Lewis bases and combinations of two or more of the above curing agents. Practically, polyamines, dicyandiamide, diaminodiphenylsulfone and their isomers, aminobenzoates, various acid anhydrides, phenol-novolac resins and cresol-novolac resins, for example, may be used, but the present disclosure is not restricted to the use of these compounds.

Other embodiments of cross-linkers that may be used are described in U.S. Pat. No. 6,613,839, and include, for example, copolymers of styrene and maleic anhydride having a molecular weight ($M_w$) in the range of from 1500 to 50,000 and an anhydride content of more than 15 percent.

Other components that may be useful in the compositions disclosed herein include curing catalysts. Examples of curing catalyst include imidazole derivatives, tertiary amines, and organic metallic salts. Other examples of such curing catalysts include free radical initiators, such as azo compounds including azoisobutyronitrile, and organic peroxides, such as tertiary-butyl perbenzoate, tertiary-butyl peroctoate, and benzoyl peroxide; methyl ethyl ketone peroxide, acetoacetic peroxide, cumene hydroperoxide, cyclohexanone hydroperoxide, dicumyl peroxide, and mixtures thereof. Methyl ethyl ketone peroxide and benzoyl peroxide are preferably used in the present invention.

In some embodiments, curing agents may include primary and secondary polyamines and their adducts, anhydrides, and polyamides. For example, polyfunctional amines may include aliphatic amine compounds such as diethylene triamine (D.E.H. 20, available from The Dow Chemical Company, Midland, Mich.), triethylene tetramine (D.E.H. 24, available from The Dow Chemical Company, Midland, Mich.), tetraethylene pentamine (D.E.H. 26, available from The Dow Chemical Company, Midland, Mich.), as well as adducts of the above amines with epoxy resins, diluents, or other amine-reactive compounds. Aromatic amines, such as metaphenylene diamine and diamine diphenyl sulfone, aliphatic polyamines, such as amino ethyl piperazine and polyethylene polyamine, and aromatic polyamines, such as metaphenylene diamine, diamino diphenyl sulfone, and diethyltoluene diamine, may also be used.

Anhydride curing agents may include, for example, nadic methyl anhydride, hexahydrophthalic anhydride, trimellitic anhydride, dodecenyl succinic anhydride, phthalic anhydride, methyl hexahydrophthalic anhydride, tetrahydrophthalic anhydride, and methyl tetrahydrophthalic anhydride, among others.

The hardener or curing agent may include a phenol-derived or substituted phenol-derived novolac or an anhydride. Non-limiting examples of suitable hardeners include phenol novolac hardener, cresol novolac hardener, dicyclopentadiene phenol hardener, limonene type hardener, anhydrides, and mixtures thereof.

In some embodiments, the phenol novolac hardener may contain a biphenyl or naphthyl moiety. The phenolic hydroxy groups may be attached to the biphenyl or naphthyl moiety of the compound. This type of hardener may be prepared, for example, according to the methods described in EP915118A1. For example, a hardener containing a biphenyl moiety may be prepared by reacting phenol with bismethoxymethylene biphenyl.

In other embodiments, curing agents may include dicyandiamide, boron trifluoride monoethylamine, and diaminocyclohexane. Curing agents may also include imadazoles, their salts, and adducts. These epoxy curing agents are typically solid at room temperature. Examples of suitable imadazole curing agents are disclosed in EP906927A1. Other curing agents include aromatic amines, aliphatic amines, anhydrides, and phenols.

In some embodiments, the curing agents may be an amino compound having a molecular weight up to 500 per amino group, such as an aromatic amine or a guanidine derivative. Examples of amino curing agents include 4-chlorophenyl-N,N-dimethyl-urea and 3,4-dichlorophenyl-N,N-dimethyl-urea.

Other examples of curing agents useful in embodiments disclosed herein include: 3,3'- and 4,4'-diaminodiphenylsulfone; methylenedianiline; bis(4-amino-3,5-dimethylphenyl)-1,4-diisopropylbenzene available as EPON 1062 from Shell Chemical Co.; and bis(4-aminophenyl)-1,4-diisopropylbenzene available as EPON 1061 from Shell Chemical Co.

Thiol curing agents for epoxy compounds may also be used, and are described, for example, in U.S. Pat. No. 5,374,668. As used herein, "thiol" also includes polythiol or polymercaptan curing agents. Illustrative thiols include aliphatic thiols such as methanedithiol, propanedithiol, cyclohexanedithiol, 2-mercaptoethyl-2,3-dimercaptosuccinate, 2,3-dimercapto-1-propanol(2-mercaptoacetate), diethylene glycol bis(2-mercaptoacetate), 1,2-dimercaptopropyl methyl ether, bis(2-mercaptoethyl)ether, trimethylolpropane tris(thioglycolate), pentaerythritol tetra(mercaptopropionate), pentaerythritol tetra(thioglycolate), ethyleneglycol dithioglycolate, trimethylolpropane tris(beta-thiopropionate), tris-mercaptan derivative of tri-glycidyl ether of propoxylated alkane, and dipentaerythritol poly(beta-thiopropionate); halogen-substituted derivatives of the aliphatic thiols; aromatic thiols such as di-, tris- or tetra-mercaptobenzene, bis-, tris- or tetra-(mercaptoalkyl)benzene, dimercaptobiphenyl, toluenedithiol and naphthalenedithiol; halogen-substituted derivatives of the aromatic thiols; heterocyclic ring-containing thiols such as amino-4,6-dithiol-sym-triazine, alkoxy-4,6-dithiol-sym-triazine, aryloxy-4,6-dithiol-sym-triazine and 1,3,5-tris(3-mercaptopropyl) isocyanurate; halogen-substituted derivatives of the heterocyclic ring-containing thiols; thiol compounds having at least two mercapto groups and containing sulfur atoms in addition to the mercapto groups such as bis-, tris- or tetra(mercaptoalkylthio) benzene, bis-, tris- or tetra(mercaptoalkylthio)alkane, bis (mercaptoalkyl)disulfide, hydroxyalkylsulfidebis (mercaptopropionate), hydroxyalkylsulfidebis (mercaptoacetate), mercaptoethyl ether bis (mercaptopropionate), 1,4-dithian-2,5-diolbis (mercaptoacetate), thiodiglycolic acid bis(mercaptoalkyl ester), thiodipropionic acid bis(2-mercaptoalkyl ester), 4,4-thiobutyric acid bis(2-mercaptoalkyl ester), 3,4-thiophenedithiol, bismuththiol and 2,5-dimercapto-1,3,4-thiadiazol.

The curing agent may also be a nucleophilic substance such as an amine, a tertiary phosphine, a quaternary ammonium salt with a nucleophilic anion, a quaternary phosphonium salt with a nucleophilic anion, an imidazole, a tertiary arsenium salt with a nucleophilic anion, and a tertiary sulfonium salt with a nucleophilic anion.

Aliphatic polyamines that are modified by adduction with epoxy resins, acrylonitrile, or (meth)acrylates may also be utilized as curing agents. In addition, various Mannich bases can be used. Aromatic amines wherein the amine groups are directly attached to the aromatic ring may also be used.

Quaternary ammonium salts with a nucleophilic anion useful as a curing agent in embodiments disclosed herein may include tetraethyl ammonium chloride, tetrapropyl ammonium acetate, hexyl trimethyl ammonium bromide, benzyl trimethyl ammonium cyanide, cetyl triethyl ammonium azide, N,N-dimethylpyrrolidinium cyanate, N-methylpyridinium phenolate, N-methyl-o-chloropyridinium chloride, methyl viologen dichloride and the like.

In some embodiments, at least one cationic photoinitiator may be used. Cationic photoinitiators include compounds that decompose when exposed to electromagnetic radiation of a particular wavelength or range of wavelengths to form a cationic species that may catalyze the polymerization reaction, such as between an epoxide group and a hydroxyl group. That cationic species may also catalyze the reaction of epoxide groups with other epoxide-reactive species contained in the curable composition (such as other hydroxyl groups, amine groups, phenolic groups, mercaptan groups, anhydride groups, carboxylic acid groups and the like). Examples of cationic photoinifiators include diaryliodonium salts and triarylsulfonium salts. For example, a diaryliodonium salt type of photoinitiator is available from Ciba-Geigy under the trade designation IRGACURE 250. A triarylsulfonium-type photoinitiator is available from The Dow Chemical Company as CYRACURE 6992. The cationic photoinitiator may be used in a catalytically effective amount, and may constitute up to about 10 weight percent of the curable composition Catalysts In some embodiments, a catalyst may be used to promote the reaction between the epoxy resin component and the curing agent or hardener. Catalysts may include a Lewis acid, for example boron trifluoride, conveniently as a derivative with an amine such as piperidine or methyl ethylamine. Catalysts may also be basic, such as, for example, an imidazole or an amine. Other catalysts may include other metal halide Lewis acids, including stannic chloride, zinc chloride, and the like, metal carboxylate-salts, such as stannous octoate and the like; benzyl dimethylamine; dimethyl aminomethyl phenol; and amines, such as triethylamine, imidazole derivatives, and the like.

Tertiary amine catalysts are described, for example, in U.S. Pat. No. 5,385,990, incorporated herein by reference. Illustrative tertiary amines include methyldiethanolamine, triethanolamine, diethylaminopropylamine, benzyldimethyl amine, m-xylylenedi(dimethylamine), N,N'-dimethylpiperazine, N-methylpyrrolidine, N-methyl hydroxypiperidine, N,N,N'N'-tetramethyldiaminoethane, N,N,N',N'N-pentamethyldiethylenetriamine, tributyl amine, trimethyl amine, diethyldecyl amine, triethylene diamine, N-methyl morpholine, N,N,N'N'-tetramethyl propane diamine, N-methyl piperidine, N,N'-dimethyl-1,3-(4-piperidino)propane, pyridine and the like. Other tertiary amines include 1,8-diazobicyclo[5.4.0]undec-7-ene, 1,8-diazabicyclo[2.2.2]octane, 4-dimethylaminopyrridine, 4-(N-pyrrolidino)pyridine, triethyl amine and 2,4,6-tris(dimethylaminomethyl)phenol.

Inorganic Nanofillers

The inorganic nanofillers may be generally any filler or combination of fillers having at least one dimension (length, width, or thickness) from about 0.1 to about 100 nanometers. For example, for powders, at least one dimension may be characterized as the grain size; for whiskers and fibers, the at least one dimension is the diameter; and for plates and films, the at least one dimension is the thickness. Clays, for example, may be dispersed in an epoxy resin-based matrix, and the clays may be broken down into very thin constituent layers when dispersed in the epoxy resin under shear.

In some embodiments, useful inorganic nanofillers include any of the known filler materials having a particle size in the nanometer range including $SiO_2$, SiC (nanowhiskers), carbon nanotubes, and nanoclays. Nanofillers may include clays, both as found naturally and modified by subsequent chemical reactions; precipitated, fumed, or aerogel silicas including those having at least 50 wt. % $SiO_2$; and mined mineral products high in $SiO_2$ content (e.g. at least 25, 50, or 75 wt. % $SiO_2$) such as diatomaceous earth, mica, wollastonite, and the like. In some embodiments, clays may be made organophilic by intercalating organic or polymeric molecules between them, and are obtained in particular according to a process as described in U.S. Pat. No. 5,578,672.

Nanofiller compositions may include metals (e.g., Cu, Ag, Ni, Fe, Al, Pd, and Ti), oxide ceramics (e.g., $TiO_2$, $Ti_xO_y$, $BaFe_2O_4$, dielectric compositions, ferrites, and manganites), carbide ceramics (e.g., SiC, BC, TiC, $WC_xWC_y$), nitride ceramics (e.g., $Si_3N_4$, TiN, VN, AlN, and $Mo_2N$), hydroxides (e.g., aluminum hydroxide, calcium hydroxide, and barium hydroxide), borides (e.g., $AlB_2$ and $TiB_2$), phosphides (e.g., NiP and VP), sulfides (e.g., molybdenum sulfide, titanium sulfide, and tungsten sulfide), silicides (e.g., $MoSi_2$), chalcogenides (e.g., $Bi_2Te_3$, $Bi_2Se_3$), and combinations of these.

In some embodiments, nanofillers may be produced by a variety of methods, such as those described in U.S. Pat. Nos. 5,486,675; 5,447,708; 5,407,458; 5,219,804; 5,194,128; and 5,064,464. Other nanofillers and methods of making nanofillers are described in U.S. Pat. Nos. 5,984,997 and 5,851,507 and U.S. Patent Application Publication Nos. 20070142548 and 20050031870, each of which is hereby incorporated by reference.

As used herein, the term "aspect ratio" refers to the ratio of the maximum to the minimum dimension of a particle. In some embodiments, the nanofillers may have an aspect ratio ranging from 1 to 30. In other embodiments, nanofillers may have an aspect ratio ranging from 1 to 20; from 1 to 15 in other embodiments, from 1 to 10 in other embodiments; from 1 to 5 in other embodiments; and from 1 to 3 in yet other embodiments.

Clays useful in embodiments disclosed herein may be of the smectite type, either of natural origin, such as in particular montmorillonites, bentonites, saponites, hectorites, fluorohectorites, beidellites, stibensites, nontronites, stipulgites, attapulgites, illites, vermiculites, halloysites, stevensites, zeolites, fuller's earth and mica, or of synthetic origin, such as permutites. Nanofillers may also include swellable layered inorganic materials such as volkonskoite, sauconite, magadiite, medmontite, and kenyaite. Other layered materials or multilayered aggregates having little or no charge on the surface of the layers may also be used provided they may be intercalated with swelling agents that expand their interlayer spacing. Conversely, layered materials having more charge than those previously cited such as members of the mica family may also be used provided they may be intercalated with swelling agents which expand their interlayer spacing. Mixtures of one or more such materials may also be employed.

Organophilic clays, such as those described in U.S. Pat. No. 6,117,932 may also be used. For example, the clay may be modified with an organic substance by ionic bonding with an onium ion having 6 carbon atoms or more. Example of organic onium ions may include hexylammonium ions, octylammonium ions, 2-ethylhexylammonium ions, dodecylammonium ions, laurylammonium ions, octadecylammonium (stearylammonium) ions, dioctyldimethylammonium ions, trioctylammonium ions, distearyldimethyl ammonium ions, stearyltrimethylammonium ions and ammonium laurate ions.

Additional representative examples of layered materials include illite minerals such as ledikite; the layered double hydroxides or mixed metal hydroxides which have positively charged layers and exchangeable anions in the interlayer spaces; chlorides such as $FeCl_3$ and FeOCl, chalcogenides such as $TiS_2$, $MoS_2$, and $MoS_3$; cyanides such as $Ni(CN)_2$; and oxides such as $H_2Si_2O_5$, $V_5O_{13}$, $HTiNbO_5$, $Cr_{0.5}V_{0.5}S_2$, $W_{0.2}V_{2.8}O_7$, $Cr_3O_8$, $MoO_3.(OH)_2$, $VOPO_4.2H_2O$, $CaPO_4CH_3.H_2O$, $MnHAsO_4.H_2O$, and $Ag_6Mo_{10}O_{33}$. Other swellable layered inorganic materials or multi-layer aggregates having little or no charge on the surface of the layers may also be used provided they may be intercalated with swelling agents that expand their interlayer spacing. Mixtures of one or more such materials may also be employed.

In some embodiments, nanofillers include swellable layered inorganics that have charges on the layers and exchangeable ions such as sodium, potassium, and calcium cations, which may be exchanged, such as by ion exchange, with ions, including onium ions such as ammonium cations, or reactive organosilane compounds, that cause the multi-lamellar particles to delaminate or swell. Inorganic layered silicates include montmorillonite, nontronite, beidellite, volkonskoite, hectorite, saponite, sauconite, magadiite, and kenyaite.

The swellable layered inorganic material may be rendered organophilic by a process known as "intercalation" which comprises introducing intercalants (neutral or charged species) into the interlayer or interfibril spaces of the swellable layered inorganic material by either insertion, in the case of neutral molecules, or ion exchange, in the case of ions. Intercalation may also increase the interlayer spacing of the swellable layered inorganic material. The term "interlayer or interfibril space or spacing" as used herein refers to the distance between the faces of the layers or the distance between fibrils. In the case of ions, the ions may be exchanged for larger species of the same charge such as, for example, the exchange of sodium or calcium ion with an onium cation.

Henceforth, any layered material described containing a neutral or charged species in the interlayer region that results in an increase of the layer spacing prior to the formation of the composite will be referred to as an intercalated material or intercalated inorganic silicate. This description also includes those layered materials or inorganic silicates which have been rendered organophilic. Such materials are commonly known as organoclays.

The intercalants act to weaken the interlayer cohesive energy by swelling the interlayer distances and function to increase the compatibility and bonding of the layers with the polymer matrix by having attractive interaction with both the layers and the polymer. Intercalants that function to swell interlayer or interfibril distances are referred to hereinafter as "swelling agents," those which function to increase the compatibility and bonding of the layers or fibrils with the polymer are referred to as "compatibilizing agents" and those which function as swelling agents and compatibilizing agents are referred to as "swelling/compatibilizing agents."

The intercalant may be introduced into the spaces between every layer or fibril, nearly every layer or fibril of the swellable layered inorganic material, or a significant fraction of the layers or fibrils. The processes of introducing intercalants into the interlayer areas of swellable layered materials are known to those skilled in the art. See, for example, U.S. Pat. Nos. 4,889,885, 5,952,093, and 6,287,992. It is not intended that these methods are limited to any specific process or procedure.

Intercalants typically contain a functional group which reacts with the surface of the layers of the layered material and displaces, totally or in part, the original ions, and bonds to the surface of the layers. These functional groups which may be reactive with the epoxy or toughening agent include nucleophilic or electrophilic functional groups which are capable of electrophilic or nucleophilic displacement reactions, coupling reactions, and varying ring opening reactions. Examples of such functional groups include amino, carboxy, acylhalide, acyloxy, hydroxy, isocyanato ureido, halo, epoxy, and epichlorohydrin. In other embodiments, functional groups may include water-soluble polymers, onium compounds such as an ammonium, phosphonium or sulfonium salt, amphoteric surface-active agents, choline compounds, and organosilane compounds.

Representative examples of onium compounds which may be used as the organic intercalants in the practice of the present invention include cationic surface-active agents, such as quaternary ammonium salts having octadecyl, hexadecyl, tetradecyl, or dodecyl moieties, including octadecyl trimethyl ammonium salt, dioctadecyl dimethyl ammonium salt, hexadecyl trimethyl ammonium salt, dihexadecyl dimethyl ammonium salt, tetradecyl trimethyl ammonium salt, ditetradecyl dimethyl ammonium salt dihydroxyethyl methyl octadecyl ammonium salt, dihydroxyethyl methyl hydrogenated tallow ammonium salt, quaternary ammonium salts containing substituents incorporating polyoxyalkylene segments and salts of polyoxyalkylene polyamines, such as the JEFFAMINE products of Huntsman Corp.

Representative examples of water-soluble polymers that can be used as the organic intercalants include water-soluble polymers of vinyl alcohol such as poly(vinyl alcohol); polyalkylene glycols such as polyethylene glycol; water-soluble cellulose polymers such as methyl cellulose and carboxymethyl cellulose; the polymers of ethylenically unsaturated carboxylic acids such as poly(acrylic acid), and their salts; and polyvinyl pyrrolidone. The monomer unit of such polymers may also be used, such as ethylene glycol, propylene glycol, or mixtures thereof.

Representative examples of the amphoteric surface-active agents which may be used as the organic intercalants include surfactants having an aliphatic amine cationic moiety and a carboxyl, sulfate, sulfone or phosphate as the anionic moiety.

Representative examples of choline compounds which may be used as the organic intercalants include $[HOCH_2CH_2N(CH_3)_3]^+OH^-$, $[HOCH_2CH_2N(CH_3)_3]^+Cl^-$, $[HOCH_2CH_2N(CH_3)_3]^+[C_4H_5O_6]^-$, $[HOCH_2CH_2N(CH_3)_3]^+[C_6H_7O_7]^-$, and $[HOCH_2CH_2N(CH_3)_3]^+[C_6H_2O_7]^-$.

Organic materials other than those described may also be employed as the organic intercalants provided they may be intercalated between the layers of the multilayered particulate material.

The intercalated layered material of the present invention is an intercalated silicate having a layer thickness of from 7 Angstroms to 12 Angstroms. This layer thickness does not include the thickness of the intercalant moiety.

The amount of nanofillers in an epoxy resin-based composition may be from about 0.1 or 1 to about 45 or 50 parts by weight per 100 parts by weight of the epoxy resin in some embodiments. In other embodiments, the nanofiller may be in an epoxy resin-based composition from about 0.2 or 2 to about 20 parts by weight per 100 parts by weight of the epoxy resin; and from about 0.3 or 3 to about 10 parts by weight per 100 parts by weight of the epoxy resin in yet other embodiments.

Amphiphilic Toughening Agents

Toughening agents may be used to prevent the composites disclosed herein from becoming brittle when the epoxy resin cures. In some embodiments, toughening agents may be rubber compounds and block copolymers. Toughening agents function by forming a secondary phase within the polymer matrix. This secondary phase is rubbery and hence is capable of crack growth arrestment, providing improved impact toughness.

In some embodiments, the amphiphilic toughening agents may form a secondary phase having at least one dimension on the nanometer scale, i.e. from about 0.1 to about 500 nanometers. In other embodiments, the toughening agents may form a secondary phase and have at least one dimension ranging from about 0.1 to about 100 nanometers; and from about 0.1 to about 50 nanometers in other embodiments.

Various amphiphilic block copolymers may be used as amphiphilic toughening agents in embodiments disclosed herein. Amphiphilic polymers are described in, for example, U.S. Pat. No. 6,887,574 and WO 2006/052727. For example, amphiphilic polyether block copolymers used in embodiments disclosed herein may include any block copolymer containing an epoxy resin miscible block segment comprising at least one polyether structure; and an epoxy resin immiscible block segment comprising at least one polyether structure. The amphiphilic polyether block copolymer may include one or more polyether block copolymers comprising at least one epoxy miscible polyether block segment derived from an alkylene oxide such as ethylene oxide (EO) and at least one epoxy immiscible polyether block segment derived from an alkylene oxide with at least greater than 3 carbon atoms, for example 1,2-epoxy butane known commonly as butylene oxide (BO). The immiscible block segment may also be comprised of mixtures of $C_4$ or higher carbon analogue monomers that are copolymerized together to provide the immiscible block segment. The immiscible block may also contain lower molecular weight co-monomers such as EO. The polyether block copolymer contains at least one epoxy resin miscible polyether block segment, E, and at least one epoxy resin immiscible polyether block segment, M.

The polyether block copolymer component may contain at least two or more amphiphilic polyether block copolymer segments. Examples of the amphiphilic polyether block copolymer may be selected from the group consisting of a diblock (EM); a linear triblock (EME or EME); a linear tetrablock (EMEM); a higher order multiblock structure $(EMEM)_xE$ or $(MEME)_xM$, where X is an integer value ranging from 1-3; a branched block structure; or a star block structure; and any combination thereof. Amphiphilic polyether block copolymers consisting of branched block structures or star block structures contain at least one epoxy monomer miscible block and at least one epoxy monomer immiscible block. Examples of the epoxy resin miscible polyether block segment, E, include a polyethylene oxide block, a propylene oxide block, a poly(ethylene oxide-co-propylene oxide) block, a poly(ethylene oxide-ran-propylene oxide) block and mixtures thereof. In some embodiments, the epoxy resin miscible polyether block segment useful in the present invention is a polyethylene oxide block.

Generally, the epoxy resin immiscible polyether block segment, M, includes an epoxidized alpha olefin having a carbon atom of from $C_4$ to $C_{20}$. Examples of the epoxy resin immiscible polyether block segment, M, include a polybutylene oxide block, a polyhexylene oxide block derived from 1,2 epoxy hexane, a polydodecylene oxide block derived from 1,2-epoxy dodecane, and mixtures thereof.

In another embodiment, when the polyether block copolymer has a multiblock copolymer structure, other block segments in addition to E and M may be present in the block copolymer. Examples of other miscible segments of the block copolymer include polyethylene oxide, polymethyl acrylate, and mixtures thereof. Examples of other immiscible segments of the block copolymer include polyethylene propylene (PEP), polybutadiene, polyisoprene, polydimethyl siloxane, polybutylene oxide, polyhexylene oxide, polyalkyl methyl methacrylate, such as polyethyl hexyl methacrylate, and mixtures thereof.

The amphiphilic polyether block copolymers may include, for example, a diblock copolymer, a linear triblock, a linear tetrablock, a higher order multiblock structure, a branched block structure, or star block structure. For example, the polyether block copolymer may contain a poly(ethylene oxide) block, a poly(propylene oxide) block or a poly(ethylene oxide-co-propylene oxide) block; and an alkylene oxide block based on a $C_4$ or higher carbon analog block, such as, for example, 1,2-epoxybutane, 1,2-epoxyhexane, 1,2-epoxydodecane, or 1,2-epoxyhexadecane block. Other examples of the alkylene oxide blocks may include VIKOLOX epoxidized alpha-olefins, including $C_{10}$-$C_{30+}$ olefins, commercially available from Total Petrochemicals.

In some embodiments, suitable block copolymers include amphiphilic polyether diblock copolymers such as, for example, poly(ethylene oxide)-b-poly(butylene oxide) (PEO-PBO) or amphiphilic polyether triblock copolymers such as, for example, poly(ethylene oxide)-b-poly(butylene oxide)-b-poly(ethylene oxide) (PEO-PBO-PEO).

In some embodiments, the amphiphilic polyether block copolymer may have a number average molecular weight (Mn) of from 1,000 to 30,000, for the combination of both block lengths. In other embodiments, the molecular weight of the polyether block copolymer is between 3,000 and 20,000. The composition of the block copolymer can range from 90 percent epoxy resin miscible polyalkylene oxide block and 10 percent epoxy resin immiscible polyalkylene oxide block to 10 percent epoxy resin miscible polyalkylene oxide block and 90 percent epoxy resin immiscible polyalkylene oxide block.

Small amounts of homopolymers from each of the respective block segments may be present in the final amphiphilic polyether block copolymer. For example, from 1 weight percent to 50 weight percent in some embodiments, or from 1 weight percent to 10 weight percent in other embodiments, of a homopolymer that is similar or identical in structure with the miscible or the immiscible block may be added to the curable compositions described herein.

In addition to the amphiphilic polyether block copolymers used in the resin composition, other amphiphilic block copolymers may also be used. Examples of additional amphiphilic block copolymers include, for example, poly (ethylene oxide)-b-poly(ethylene-alt propylene) (PEO-PEP), poly(isoprene-ethylene oxide) block copolymers (PI-b-PEO), poly(ethylene propylene-b-ethylene oxide) block copolymers (PEP-b-PEO), poly(butadiene-b-ethylene oxide) block copolymers (PB-b-PEO), poly(isoprene-b-ethylene oxide-b-isoprene)block copolymers (PI-b-PEO-PI), poly (isoprene-b-ethylene oxide-b-methylmethacrylate) block copolymers (PI-b-PEO-b-PMMA); and mixtures thereof.

Also, a single PEO-PBO diblock copolymer may be used alone, or more than one PEO-PBO diblock copolymer may be combined to be used as well. In one embodiment, PEO-PBO diblock copolymer is used, wherein the diblock copolymer has 20 percent PEO and 80 percent PBO to 80 percent PEO and 20 percent PBO; and having block sizes of molecular weights (Mn) of PBO 2000 or higher and molecular weights of PEO 750 or higher; and provides various morphologies. For example, some embodiments include a diblock with a PBO block length of from 2,500 to 3,900 that provides spherical micelles.

Another example includes a diblock with a PBO segment of 6,400 that provides worm-like micelles. Still another example is a diblock with a short (Mn=750) PEO block segment that provides an agglomerated vesicle morphology. Yet another example includes a mixture of a PEO-PBO diblock with a low molecular weight PBO homopolymer that provides a spherical micelle in which the PBO homopolymer sequesters into the micelle without forming a separate macrophase; the PBO homopolymer macrophase separate; when added without the diblock present.

In some embodiments, amphiphilic diblock copolymers may have an epoxy miscible block and an epoxy immiscible block in which the epoxy miscible block is poly(ethylene oxide) (PEO) and the immiscible block is a saturated polymeric hydrocarbon. For example, Journal of Polymer Science, Part B: Polymer Physics, 2001, 39(23), 2996-3010 describes the use of a poly(ethylene oxide)-b-poly(ethylene-alt-propylene) (PEO-PEP) diblock copolymer. Journal of the American Chemical Society, 1997, 119(11), 2749-2750 describes epoxy systems with self-assembled microstructures brought using amphiphilic PEO-PEP and poly(ethylene oxide)-b-poly(ethyl ethylene) (PEO-PEE) diblock copolymers.

Other block copolymers incorporating an epoxy-reactive functionality in one block may also be used as modifiers for epoxy resins to achieve nanostructured epoxy thermosets. For example, Macromolecules, 2000, 33(26) 9522-9534 describes the use of poly(epoxyisoprene)-b-polybutadiene (BIxn) and poly(methylacrylate-co-glycidyl methacrylate)-b-polyisoprene (MG-I) diblock copolymers that are amphiphilic in nature and are designed in such a way that one of the blocks can react into the epoxy matrix when the resin is cured. Also, Journal of Applied Polymer Science, 1994, 54, 815 describes epoxy systems having submicron scale dispersions of poly(caprolactone)-b-poly(dimethylsiloxane)-b-poly(caprolactone) triblock copolymers.

In other embodiments, self-assembled amphiphilic block copolymers for modifying thermosetting epoxy resins to form nanostructured epoxy thermosets may be used. For example, Macromolecules, 2000, 33, 5235-5244, and Macromolecules, 2002, 35, 3133-3144, describe the addition of a poly(ethylene oxide)-b-poly(propylene oxide) (PEO-PPO) diblock and a poly(ethylene oxide)-b-poly(propylene oxide)-b-poly(ethylene oxide) (PEO-PPO-PEO) triblock to an epoxy cured with methylene dianiline, where the average size of the dispersed phase in the diblock-containing blends is of the order of 10-30 nm. And, a polyether block copolymer such as a PEO-PPO-PEO triblock may also be used, as described in Japanese Patent Application Publication No. H9-324110.

The amount of amphiphilic block copolymers used in the curable compositions described herein may depend on a variety of factors including the equivalent weight of the polymers, as well as the desired properties of the products made from the composition. In general, the amount of amphiphilic block copolymers may be from 0.1 weight percent to 30 weight percent in some embodiments, from 0.5 weight percent to 10 weight percent in other embodiments, and from 1 weight percent to 5 weight percent in yet other embodiments, based on the total weight of the curable composition.

The thermosetting resin compositions disclosed herein may contain at least one or more amphiphilic block copolymers mixed with the thermosetting resin. In addition, two or more different amphiphilic block copolymers may be blended together to make up the block copolymer component. More than one block copolymer can be combined to gain additional control of the nanostructure, that is, shape and dimension.

Other amphiphilic block copolymers are disclosed in PCT Patent Application Publications WO2006/052725, WO2006/052726, WO2006/052727, WO2006/052729, WO2006/052730, and WO2005/097893, U.S. Pat. No. 6,887,574, and U.S. Patent Application Publication No. 20040247881, each of which is incorporated herein by reference.

The polyether block copolymers may provide uniformly dispersed and uniformly scaled nano-sized structures which preferably form (template) in the liquid resin matrix due to micellization brought about by the balance of immiscibility of one block segment and miscibility of the other block segment. The micellar structures are preserved into the cured epoxy thermoset, or form during the curing process. The micellar morphology of the nano-templated resin can be for example, spherical, worm-like, and vesicles. Micellar morphologies are advantageously obtained at low (for example, less than 5 weight percent) concentrations of block copolymers; that is, the morphological features are not associated with one another or packed into a three dimensional lattice. At higher concentrations self-assembled structures can form spherical, cylindrical, or lamellar morphological features that are associated with one another by lattice interactions, also at a nanometer size scale.

Optional Additives

The composition may also include optional additives and fillers conventionally found in epoxy systems. Additives and fillers may include silica, glass, talc, metal powders, titanium dioxide, wetting agents, pigments, coloring agents, mold release agents, toughening agents, coupling agents, flame retardants, ion scavengers, UV stabilizers, flexibilizing agents, and tackifying agents. Additives and fillers may also include fumed silica, aggregates such as glass beads, polytetrafluoroethylene, polyol resins, polyester resins, phenolic resins, graphite, molybdenum disulfide, abrasive pigments, viscosity reducing agents, boron nitride, mica, nucleating agents, and stabilizers, among others. Fillers and modifiers may be preheated to drive off moisture prior to addition to the epoxy resin composition. Additionally, these optional additives may have an effect on the properties of the composition, before and/or after curing, and should be taken into account when formulating the composition and the desired reaction product.

Reinforcing Material

The reinforcing material may be a fiber, including carbon/graphite; boron; quartz; aluminum oxide; glass such as E glass, S glass, S-2 GLASS® or C glass; and silicon carbide or silicon carbide fibers containing titanium. Commercially available fibers may include: organic fibers, such as KEVLAR; aluminum oxide-containing fibers, such as NEXTEL fibers from 3M; silicon carbide fibers, such as NICALON from Nippon Carbon; and silicon carbide fibers containing titanium, such as TYRRANO from Ube. When the reinforcing material is a fiber, it may be present at 20 to 70 percent by volume in some embodiments, 50 to 65 percent by volume of the composite in other embodiments.

The fibers may be sized or unsized. When the fibers are sized, the sizing on the fibers is typically a layer 100 to 200 nm thick. When glass fibers are used, the sizing may be, for example a coupling agent, lubricant, or anti-static agent.

The fiber reinforcement may have various forms, and may be continuous or discontinuous, or combinations thereof. Continuous strand roving may be used to fabricate unidirectional or angle-ply composites. Continuous strand roving may also be woven into fabric or cloth using different weaves such as plain, satin, leno, crowfoot, and 3-dimensional. Other forms of continuous fiber reinforcement are exemplified by braids, stitched fabrics, and unidirectional tapes and fabrics.

Discontinuous fibers suitable for this invention may include milled fibers, whiskers, chopped fibers, and chopped fiber mats. When the reinforcing material is discontinuous, it may be added in an amount of 20 to 60 percent by volume of the composite in some embodiments, 20 to 30 percent by volume of the composite in yet other embodiments. Examples of suitable discontinuous reinforcing materials include milled or chopped fibers, such as glass and calcium silicate fibers. An example of a discontinuous reinforcing material is a milled fiber of calcium silicate (wollastonite; NYAD G SPECIAL®).

A combination of continuous and discontinuous fibers may be used in the same composite. For example, a woven roving mat is a combination of a woven roving and a chopped strand mat, and it is suitable for use in embodiments disclosed herein.

A hybrid comprising different types of fibers may also be used. For example, layers of different types of reinforcement may be used. In aircraft interiors, for example, the reinforcing material may include a fiber and a core, such as a NOMEX honeycomb core, or a foam core made of polyurethane or polyvinylchloride.

Curable Compositions

Curable or hardenable compositions disclosed herein may include at least one epoxy resin, at least one curing agent, at least one nanofiller, and at least one toughening agent. In some embodiments, curable compositions disclosed herein may additionally include a catalyst. In other embodiments, curable compositions disclosed herein may include a reinforcing agent. Curable compositions may be formed, in some embodiments, by admixing the above components.

The desired amount of epoxy resin in the curable composition may depend on the expected end use. Additionally, as detailed above, reinforcing materials may be used at substantial volume fractions; thus, the desired amount of epoxy resin may also depend on whether or not a reinforcing material is used. In some embodiments, curable compositions may include from about 30 to about 98 volume percent epoxy resin. In other embodiments, curable compositions may include 65 to 95 volume percent epoxy resin; from 70 to 90 volume percent epoxy resin in other embodiments; from 30 to 65 volume percent epoxy resin in other embodiments; and from 40 to 60 volume percent epoxy resin in yet other embodiments.

Curable compositions may include from about 0.1 to about 30 volume percent toughening agent in some embodiments. In other embodiments, curable compositions may include from about 1 to about 25 volume percent toughening agent; and from about 2 to about 20 volume percent toughening agent in yet other embodiments.

The type and amount of nanofiller in a composition may vary depending on the type and amount of toughening agent. Curable compositions may include from about 0.1 to about 20 volume percent nanofiller in some embodiments. In other embodiments, curable compositions may include from about 1 to about 15 volume percent nanofiller; and from about 2 to about 10 volume percent nanofiller in yet other embodiments.

The amount of reinforcing material in the composition may vary depending on the type and form of the reinforcing material and the expected end product. Curable compositions may include from about 20 to about 70 volume percent reinforcing materials in some embodiments. In other embodiments, curable compositions may include from about 30 to about 65 volume percent reinforcing materials; and from about 40 to about 60 volume percent reinforcing materials in yet other embodiments.

Curable compositions may include from about 0.1 to about 50 volume percent optional additives in some embodiments. In other embodiments, curable compositions may include from about 0.1 to about 5 volume percent optional additives; and from about 0.5 to about 2.5 volume percent optional additives in yet other embodiments.

The amount of catalyst used may vary from 0.1 to 20 parts per hundred parts epoxy resin, by weight, in some embodiments. In other embodiments, catalyst may be used in an amount ranging from 1 to 15 parts per hundred parts epoxy resin, by weight; and from 2 to 10 parts per hundred parts epoxy resin, by weight, in yet other embodiments. The specific amount of catalyst used for a given system should be determined experimentally to develop the optimum in properties desired.

Similarly the specific amount of curing agent used for a given system should be determined experimentally to develop the optimum in properties desired. Variables to consider in selecting a curing agent and an amount of curing agent may include, for example, the epoxy resin composition (if a blend), the desired properties of the cured composition (flexibility, electrical properties, etc.), desired cure rates, as well as the number of reactive groups per catalyst molecule, such as the number of active hydrogens in an amine. The amount of curing agent used may vary from 0.1 to 150 parts per hundred parts epoxy resin, by weight, in some embodiments. In other embodiments, the curing agent may be used in an amount ranging from 5 to 95 parts per hundred parts epoxy resin, by weight; and the curing agent may be used in an amount ranging from 10 to 90 parts per hundred parts epoxy resin, by weight, in yet other embodiments.

Composite Formation/End Uses/Processing

The epoxy resins and the composites described herein may be produced conventionally, the only alteration in such a practice is the introduction of the nanofillers and the toughening agents to the epoxy resins before they are cured. In some embodiments, composites may be formed by curing the curable epoxy resin compositions disclosed herein. In other embodiments, composites may be formed by applying a curable epoxy resin composition to a reinforcing material, such as by impregnating or coating the reinforcing material, and curing the curable epoxy resin composition.

Curing of the epoxy resin compositions disclosed herein usually requires a temperature of at least about 30° C., up to about 250° C., for periods of minutes up to hours, depending on the epoxy resin, curing agent, and catalyst, if used. In other embodiments, curing may occur at a temperature of at least 100° C., for periods of minutes up to hours. Post-treatments may be used as well, such post-treatments ordinarily being at temperatures between about 100° C. and 200° C.

In some embodiments, curing may be staged to prevent exotherms. Staging, for example, includes curing for a period of time at a temperature followed by curing for a period of time at a higher temperature. Staged curing may include two or more curing stages, and may commence at temperatures below about 180° C. in some embodiments, and below about 150° C. in other embodiments.

Composites disclosed herein containing both toughening agents and nanofillers may have higher fracture toughness than composites containing similar amounts of either toughening agents or nanofillers alone. As used herein, "similar amounts" refers to, for example, a composite including 5 percent by volume of a toughening agent as compared to a composite according to embodiments disclosed herein including 5 percent by volume of both a toughening agent and a nanofiller, such as 2.5 percent by volume each. In some embodiments, composites disclosed herein containing both toughening agents and nanofillers may have a fracture toughness at least 20 percent greater than composites containing similar amounts of either toughening agents or nanofillers alone. In other embodiments, composites disclosed herein containing both toughening agents and nanofillers may have a fracture toughness at least 30 percent greater than composites containing similar amounts of either toughening agents or nanofillers alone; at least 50 percent greater in other embodiments; and at least 80 percent greater in yet other embodiments.

The epoxy resin compositions disclosed herein may be useful in composites containing high strength filaments or fibers such as carbon (graphite), glass, boron, and the like. Composites may contain from about 30% to about 70%, in some embodiments, and from 40% to 70% in other embodiments, of these fibers based on the total volume of the composite.

Fiber reinforced composites, for example, may be formed by hot melt prepregging. The prepregging method is characterized by impregnating bands or fabrics of continuous fiber with a thermosetting epoxy resin composition as described herein in molten form to yield a prepreg, which is laid up and cured to provide a composite of fiber and thermoset resin.

Other processing techniques can be used to form composites containing the epoxy-based compositions disclosed herein. For example, filament winding, solvent prepregging, and pultrusion are typical processing techniques in which the uncured epoxy resin may be used. Moreover, fibers in the form of bundles may be coated with the uncured epoxy resin composition, laid up as by filament winding, and cured to form a composite.

The epoxy resin compositions and composites described herein may be useful as adhesives, structural and electrical laminates, coatings, castings, structures for the aerospace industry, as circuit boards and the like for the electronics industry, as well as for the formation of skis, ski poles, fishing rods, and other outdoor sports equipment. The epoxy compositions disclosed herein may also be used in electrical varnishes, encapsulants, semiconductors, general molding powders, filament wound pipe, storage tanks, liners for pumps, and corrosion resistant coatings, among others.

EXAMPLES

Comparative Sample 1

An 8 inch by 7 inch aluminum mold (with DuoFoil) is heated in a 100° C. forced air oven for at least 1-2 hours before a plaque is made. An epoxy resin (D.E.R.™ 383 liquid resin, a reaction product of epichlorohydrin and bisphenol-A having a viscosity of about 10,000 mPa-s (ASTM D-445 at 25° C.), available from The Dow Chemical Company, Midland, Mich.) is added to a 500 mL single neck round bottom rotary evaporator (RE) flask. Next, a curing agent (DURITE 1731 (SD 1731) flakes, a phenol-formaldehyde novolac, available from Borden Chemical, Inc., Louisville, Ky.) is added via a plastic funnel to the RE flask containing the D.E.R. 383. The curing agent is used at a loading of approximately 35 weight percent. The funnel is rinsed into the RE flask with acetone, with the acetone added to the RE flask. The epoxy resin and curing agent mixture is allowed to dissolve and thoroughly mix in the acetone while rotating on a rotary evaporator at 70° C. After dissolution, the acetone is slowly stripped out by gradually reducing the pressure until a final pressure of 1-5 mBars is reached and no bubbling is observed. The vacuum is released and the initiator (2-ethyl,-4-methyl-imidazole) is added to the RE flask containing the resin and curing agent, and the RE flask is placed back on the RE and allowed to mix at 70° C. for 10-15 minutes. After mixing, the pre-heated mold is removed from the oven and the mixture is poured into the pre-heated mold. The mold is placed back in the oven and the resin mix cured according to the desired temperature profile (at a temperature of 100° C. for one hour, then at a temperature of 125° C. for one hour, then at a temperature of 150° C. for two hours). After the cure schedule is completed, the mold is cooled to 40° C. while still in the oven. Final plaque size obtained from the above procedure is approximately 6 inches by 6 inches by ⅛ inch thick.

Comparative Sample 2

An 8 inch by 7 inch aluminum mold (with DuoFoil) is heated in a 100° C. forced air oven for at least 1-2 hours before plaque is made. An epoxy resin (D.E.R.™ 383 liquid resin, a reaction product of epichlorohydrin and bisphenol-A having a viscosity of about 10,000 mPa-s (ASTM D-445 at 25° C.), available from The Dow Chemical Company, Midland, Mich.) is added to a 500 mL single neck round bottom rotary evaporator (RE) flask. Next a curing agent (DURITE 1731 (SD 1731) flakes, a phenol-formaldehyde novolac, available from Borden Chemical, Inc., Louisville, Ky.) is added via a plastic funnel to the RE flask containing the D.E.R. 383. The curing agent is used at a loading of approximately 35 weight percent. The funnel is rinsed into the RE flask with acetone, with the acetone added to the RE flask. The epoxy resin and curing agent mixture is allowed to dissolve and thoroughly mix in the acetone while rotating on the rotary evaporator at 70° C. After dissolution, the acetone is slowly stripped out by gradually reducing the pressure until a final pressure of 1-5 mBars is reached and no bubbling is observed. Vacuum is then released and 5 weight percent amphiphilic toughening agent (a PEO-PBO-PEO triblock copolymer formed as described in WO 2006/052727, Preparatory Example B) is added. The RE flask is then put back on the rotary evaporator and the toughening agent is allowed to be mixed in at 70° C. with no vacuum for about 30 minutes. After mixing, initiator (2-ethyl,-4-methyl-imidazole) is added to the RE flask containing the resins and toughening agent and the RE flask is placed back on the RE and allowed to mix at 70° C. for 10-15 minutes. After mixing, the pre-heated mold is removed from the oven and the mixture is poured into the pre-heated mold. The mold is placed back in the oven and the resin mix cured according to the desired temperature profile (at a temperature of 100° C. for one hour, then at a temperature of 125° C. for one hour, then at a temperature of 150° C. for two hours). After the cure schedule is completed, the mold is cooled to 40° C. while still in the oven. Final plaque size obtained from the above procedure is approximately 6 inches by 6 inches by ⅛ inch thick.

Comparative Sample 3

An 8 inch by 7 inch aluminum mold (with DuoFoil) is heated in a 100° C. forced air oven for at least 1-2 hours before plaque is made. An epoxy resin (D.E.R.™ 383 liquid resin, a reaction product of epichlorohydrin and bisphenol-A having a viscosity of about 10,000 mPa-s (ASTM D-445 at 25° C.), available from The Dow Chemical Company, Midland, Mich.) is added to a 500 mL single neck round bottom rotary evaporator (RE) flask. Next a curing agent (DURITE 1731 (SD 1731) flakes, a phenol-formaldehyde novolac, available from Borden Chemical, Inc., Louisville, Ky.) is added via a plastic funnel to the RE flask containing the D.E.R. 383. The curing agent is used at a loading of 35 weight percent. The funnel is rinsed into the RE flask with acetone, with the acetone added to the RE flask. The epoxy resin and curing agent mixture is allowed to dissolve and thoroughly mix in the acetone while rotating on the rotary evaporator at 70° C. After dissolution, the acetone is slowly stripped out by gradually reducing the pressure until a final pressure of 1-5 mBars is reached and no bubbling is observed. Vacuum is then released and 5 weight percent nanofiller (NANOPDX F400, silica nanoparticles ranging in size from 5 to 50 nm, available from Name Chemie AG, Geesthacht, Germany) is added. The RE flask is then put back on the rotary evaporator and the nanofiller is allowed to be mixed in at 70° C. with no vacuum for about 30 minutes. After mixing, initiator (2-ethyl,-4-methyl-imidazole) is added to the RE flask containing the resins and nanofiller and the RE flask is placed back on the RE and allowed to mix at 70° C. for 10-15 minutes. After mixing, the pre-heated mold is removed from the oven and the mixture is poured into the pre-heated mold. The mold is placed back in the oven and the resin mix cured according to the desired temperature profile (at a temperature of 100° C. for one hour, then at a temperature of 125° C. for one hour, then at a temperature of 150° C. for two hours). After the cure schedule is completed, the mold is cooled to 40° C. while still in the oven. Final plaque size obtained from the above procedure is approximately 6 inches by 6 inches by ⅛ inch thick.

Sample 1

An 8 inch by 7 inch aluminum mold (with DuoFoil) is heated in a 100° C. forced air oven for at least 1-2 hours before plaque is made. An epoxy resin (D.E.R.™ 383 liquid resin, a reaction product of epichlorohydrin and bisphenol-A having a viscosity of about 10,000 mPa-s (ASTM D-445 at 25° C.), available from The Dow Chemical Company, Midland, Mich.) is added to a 500 mL single neck round bottom rotary evaporator (RE) flask. Next, a curing agent (DURITE 1731 (SD 1731) flakes, a phenol-formaldehyde novolac, available from Borden Chemical, Inc., Louisville, Ky.) is added via a plastic funnel to the RE flask containing the D.E.R. 383. The curing agent is used at a loading of approximately 35 weight percent. The funnel is rinsed into the RE flask with acetone, with the acetone added to the RE flask. The epoxy resin and curing agent mixture is allowed to dissolve and thoroughly mix in the acetone while rotating on the rotary evaporator at 70° C. After dissolution, the acetone is slowly stripped out by gradually reducing the pressure until a final pressure of 1-5 mBars is reached and no bubbling is observed. Vacuum is then released and about 2.5 weight percent of toughening agent (a PEO-PBO-PEO triblock copolymer formed as described in WO 2006/052727, Preparatory Example B) and 2.5 weight percent nanofiller (NANOPDX F400, silica nanoparticles ranging in size from 5 to 50 nm, available from Hanse Chemie AG, Geesthacht, Germany) is added. The RE flask is then put back on the rotary evaporator, and the toughening agent and nanofiller are allowed to mix at 70° C. with no vacuum for about 30 minutes. After mixing, initiator (2-ethyl,-4-methylimidazole) is added to the RE flask containing the resins, toughening agent and nanofiller, and the RE flask is placed back on the RE and allowed to mix at 70° C. for 10-15 minutes. After mixing, the pre-heated mold is removed from the oven and the mixture is poured into the pre-heated mold. The mold is placed back in the oven and the resin mix cured according to the desired temperature profile (at a temperature of 100° C. for one hour, then at a temperature of 125° C. for one hour, then at a temperature of 150° C. for two hours). After the cure schedule is completed, the mold is cooled to 40° C. while still in the oven. Final plaque size obtained from the above procedure is approximately 6 inches by 6 inches by ⅛ inch thick.

The fracture toughness, hardness, and glass transition temperature of Comparative Samples 1-3 and Sample 1 are determined. Glass transition temperature ($T_g$) is measured using ASTM D 3418, using a Differential Scanning Calorimeter (DSC), where test results are taken during the second scan. Fracture toughness ($K_{1c}$) is measured according ASTM D5045, after the specimens are machined to the proper size and notched, and a crack is initiated in the notch. The hardness is measured using ASTM D 2240, measuring the penetration of a specified indentor into the material under specified conditions of force and time. The applied force and size of indent is often used to identify or specify the hardness of a material. The specimen is first placed on a hard flat surface. The indentor for the instrument is then pressed into the specimen making sure that it is parallel to the surface. The hardness is read within one second of firm contact with the specimen. The hardness numbers are derived from a scale; Shore A and Shore D hardness scales are common, with the A scale being used for softer and the D scale being used for harder materials. Results presented in Table 1 are on the Shore D scale. Fracture toughness, hardness and glass transition temperature test results for the above described Sample and Comparative Samples are presented in Table 1.

TABLE 1

| Sample | Sample Description | Hardness (Shore D) | Fracture Toughness (MPa-m$^{0.5}$) | Glass Transition Temperature (° C.) |
|---|---|---|---|---|
| Comparative Sample 1 | Epoxy Resin + Curing Agent | 186 | 1 | 128.14 |
| Comparative Sample 2 | Epoxy Resin + Curing Agent + Toughening Agent | 187 | 1.49 | 128.82 |
| Comparative Sample 3 | Epoxy Resin + Curing Agent + Nanofiller | 186 | 1 | 133.41 |
| Sample 1 | Epoxy Resin + Curing Agent + Nanofiller + Toughening Agent | 186 | 1.8 | 121.69 |

The fracture toughness of Comparative Sample 1 (base epoxy resin) is 1 MPA-m$^{0.5}$. Comparing Comparative Sample 1 and Comparative Sample 3, adding a nanofiller, by itself, does not provide any toughening to the cured composition. Comparing Comparative Sample 1 and Comparative Sample 2, adding 5 weight percent of a toughening agent increased the fracture toughness by almost 50% to 1.49 MPa-m$^{0.5}$.

Sample 1, having both a nanofiller and a toughening agent had a higher fracture toughness than each of the Comparative Samples 1-3. Sample 1, having a lower loading level of toughening agent than Comparative Sample 2, had a higher fracture toughness than Comparative Sample 2. The improvement in fracture toughness, even at lower loading levels, may be attributed to a synergistic effect between the nanocomposite and the toughening agent.

The glass transition temperature of the Comparative Samples ranged from 128° C. to 133° C., depending upon the additive. In contrast, Sample 1 had a glass transition temperature of 121.7° C. The hardness of the Comparative Samples ranged from 186 to 187 on the Shore D scale, depending upon the additive. Sample 1 had a hardness of 186 on the Shore D scale.

Advantageously, embodiments disclosed herein may provide for composites having improved fracture properties. Embodiments disclosed herein may advantageously provide for composites having improved abrasion resistance. Composites formed from compositions described herein may include both toughening agents and nanofillers. It has been surprisingly found that there is a synergistic effect between the toughening agents and the nanofillers. Composites disclosed herein containing both toughening agents and nanofillers may have higher fracture toughness than composites containing similar amounts of either toughening agents or nanofillers alone.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed:
1. A curable composition, comprising:
  (a) an epoxy resin;
  (b) a curing agent;
  (c) an amphiphilic block copolymer toughening agent that creates a second phase with at least one dimension being on the nanometer scale; and
  (d) an inorganic nanofiller;

wherein the curable composition, when cured, provides a composite containing both a toughening agent, component (c), a nanofiller, component (d), exhibits a fracture toughness of at least 20 percent greater than a composite containing either a toughening agent, component (c) or a nanofiller, component (d), alone.

2. The curable composition of claim 1, wherein the epoxy resin ranges from about 30 to about 98 percent by volume of the curable composition.

3. The curable composition of claim 1, wherein the curable composition comprises 0.1 to 100 parts curing agent per hundred parts epoxy resin by weight.

4. The curable composition of claim 1, wherein the curable composition comprises from about 1 to about 20 percent toughening agent by volume.

5. The curable composition of claim 1, wherein the curable composition comprises from about 1 to about 10 percent nanofiller by volume.

6. The curable composition of claim 1, wherein the nanofiller comprises silica.

7. The curable composition of claim 1, further comprising a catalyst.

8. The curable composition of claim 7, wherein the curable composition comprises 0.1 to 10 parts catalyst per hundred parts epoxy resin by weight.

9. The curable composition of claim 1, further comprising from about 20 to about 70 percent by volume of a reinforcing material.

10. A composite, comprising a reaction product of a curable composition comprising:
  (a) 30 to 98 percent by volume of an epoxy resin;
  (b) a curing agent;
  (c) an amphiphilic block copolymer toughening agent forming a second phase and having at least one dimension being on the nanometer scale; and
  (d) an inorganic nanofiller wherein the curable composition, when cured, provides the composition containing both a toughening agent, component (c), and a nanofiller, component (d), exhibits a fracture toughness of at least 20 percent greater than a composite containing either a toughening agent, component (c) or a nanofiller, component (d), alone.

* * * * *